UNITED STATES PATENT OFFICE 2,119,159

BUFFING COMPOSITIONS

Clifford V. Glenning, Watertown, Conn., assignor to E. I. du Pont de Nemours & Company, Wilmington, Del., a corporation of Delaware No Drawing. Application January 21, 1937, Serial No. 121,715

14 Claims. (Cl. 51—280)

This invention relates to improved abrasive compositions, more particularly it relates to improved dry buffing compositions, more particularly it relates to dry buffing compositions containing an amine salt of a sulfated higher aliphatic alcohol, still more particularly it relates to a dry buffing composition containing a tertiary amine salt of a higher alkyl sulfate and a higher aliphatic alcohol.

This invention has as an object the preparation of an improved buffing composition. A further object is the production of buffing compositions for the polishing of metals. A still further object is the production of a buffing composition which facilitates the cutting and polishing of metals. Another object is the production of a buffing composition for the polishing of metals which eliminates scratches. A further object is the production of a dry buffing composition. An additional object is the production of a buffing composition which may be easily removed from the polished surface by washing. Other objects will appear hereinafter.

These objects are accomplished by the following invention which comprises the incorporation of an organic amine salt of a sulfated higher aliphatic alcohol into a buffing composition. More particularly they are accomplished by incorporating a pentavalent nitrogen salt of the formula:

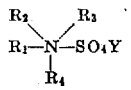

wherein R₁ represents hydrogen, an alkyl or a carbocyclic or heterocyclic ring or one end of a polymethylene chain of which R₂ is the other end, R₂, R₃ and R₄ represent hydrogen, alkyl groups, carbocyclic and heterocyclic rings, N represents an amino-nitrogen which may be an integral portion of a heterocyclic ring, and Y represents an aliphatic hydrocarbon radical having at least eight carbon atoms which may be further substituted by hydroxyl, alkoxy or halogen groups, and an aliphatic alcohol having from twelve to eighteen carbon atoms into a buffing composition. Thus, methoxy, ethoxy, propyloxy, butyloxy, chlorine, bromine, etc., groups may be present in the hydrocarbon radical Y. Still more particularly, they are accomplished by incorporating a tertiary amine salt of a higher alkyl sulfate and a higher aliphatic alcohol into a buffing composition containing normal amounts of an abrasive and a binder. The sulfated alcohols may be pure sulfates or they may contain, as they commercially do, small portions of sulfonic acids or mixtures of the same. They may be saturated or unsaturated, or bridged by a non-carbon atom such as an oxygen group and may contain from eight to twenty-four carbon atoms.

It has been found that if a mixture of about one part of an amine salt of a higher alkyl sulfate and about two parts of a higher aliphatic alcohol are added in amounts of about 2 to 4% by weight to buffing compositions during their preparation, the resulting buffing compositions are greatly improved. Thus, they have the improved working characteristics of reducing scratches on the surfaces of the materials treated and of being washed from the surface with facility. The amine salts and the higher aliphatic alcohol may be added to the buffing composition during the preparation of the same at various stages. Thus, the fatty or waxy ingredients of the buffing composition may be first liquefied, the amine salts of the higher alkyl sulfates and the higher alcohols added, and then the abrasives added and intimately mixed therewith. The abrasives can be added to a mixture of the amine salts of the higher alkyl sulfates and higher alcohols, and the latter added to a liquified mixture of the binders, or the abrasive material may be first incorporated in the liquefied binder and then the amine salts of the higher alkyl sulfates and higher alcohols added simultaneously or separately or in admixture. The compositions are then solidified into various commercial forms; preferably they are cast into bars.

Buffing compositions, which are known also as rough or metal polishes, in general consists of a mixture of a binder and an abrasive. The binders commonly used are fatty or waxy materials such as stearic acid, stearine, petrolatum, tallow, or waxes. The waxes may be of mineral, vegetable or animal origin. As a general rule, fatty or waxy materials of animal origin are preferred. Petrolatum, when admixed with animal waxes, has special utility.

The common types of abrasives used in buffing compositions are tripoli, rouge, (iron oxide), lime, magnesium oxide, mixtures of lime and magnesium oxide, alumina, carborundum, chromium oxide, etc. Other abrasives may be used for special purposes where a soft polish is desired, such as technical aluminum silicate.

Metal and other surfaces are buffed or polished by the application of the buffing composition in bar form to a buffing wheel. There are two general types of buffing operations in connection with the treatment of metal surfaces. A cutting operation in general defines a relatively heavy polish which is imparted by the action of a rapidly revolving laminated cotton cloth polishing wheel on the metal object. In the cutting operation a fairly coarse grade of abrasive is used. A coloring operation in general is a light high polish imparted by a cloth polishing wheel to a metal object. The polish is likewise obtained by the action of a rapidly revolving laminated cotton cloth polishing wheel. The bar of rouge is applied intermittently to the revolving polishing wheel. In general, a very fine grade of an abrasive is used in the coloring operation. The coloring operation is so-called because of the fact that the coloring of the metal surface is brought up as a result of the buffing operation.

After polishing, the metal and other surfaces are washed free of the buffing compositions. The surfaces may be treated in various ways after having been polished. Thus, they may be coated with lacquers, enamels, paints, and other coating compositions, or electro-plated, being very receptive to such treatment.

The invention is further illustrated but is not limited by the following examples. Examples I, II and III are representative cutting down compositions.

Example I

|  | Pounds |
|---|---|
| Double pressed stearic acid | 200 |
| No. 4 petrolatum | 125 |
| Once-ground tripoli | 680 |
| Technical octadecyl alcohol | 14 |
| Diethyl-cyclohexylamine salt of sulfated technical dodecyl alcohol | 7 |

The double pressed stearic acid and petrolatum mixture is first liquefied, then the tripoli is slowly added to the liquefied mixture and intimately mixed therewith. Then a mixture consisting of about two parts of technical octadecyl alcohol and about one part of the diethyl-cyclohexylamine salt of sulfated technical dodecyl alcohol is added to the composition and intimately mixed therewith. The liquefied mass is allowed to cool and is then cast into bars. In place of the diethyl-cyclohexylamine salt of sulfated dodecyl alcohol, other amine salts such as triethanolamine dodecyl sulfate, triethanolamine octadecyl sulfate, trimethylamine dodecyl sulfate, cyclohexylamine octadecyl sulfate, butylamine dodecyl sulfate, dimethylamine tetradecyl sulfate, piperidine hexadecyl sulfate, tetraethylammonium dodecyl sulfate, dimethylaniline hexadecyl sulfate, and diethyl-cyclohexylamine dodecyl sulfonate may be used.

Example II

|  | Pounds |
|---|---|
| Hydrogenated fish oil acids | 100 |
| Double pressed stearic acid | 100 |
| No. 4 petrolatum | 125 |
| Once-ground tripoli | 680 |
| Technical octadecyl alcohol | 14 |
| Diethyl-cyclohexylamine salt of sulfated technical dodecyl alcohol | 7 |

The mixture of octadecyl alcohol and the amine salt of dodecyl sulfate may be added to the liquefied mixture of fish oil acids, stearic acid and petrolatum in a similar manner.

Example III

|  | Pounds |
|---|---|
| Hydrogenated fish oil acids | 200 |
| No. 4 petrolatum | 125 |
| Once-ground tripoli | 680 |
| Technical octadecyl alcohol | 14 |
| Diethyl-cyclohexylamine salt of sulfated technical dodecyl alcohol | 7 |

The mixture is made up in the same manner as in Example I. Thus, the fish oil acid and petrolatum are liquefied, the abrasive added, and then the mixture of alcohol and amine salt added with agitation.

Example IV

|  | Pounds |
|---|---|
| Double pressed stearic acid | 200 |
| No. 4 petrolatum | 125 |
| Once-ground tripoli | 680 |
| Diethyl-cyclohexylamine salt of sulfated octadecyl alcohol | 7 |
| Dodecyl alcohol | 14 |

The composition is made up in the same manner as Example I.

Example V

|  | Pounds |
|---|---|
| Hydrogenated fish oil acids | 100 |
| Double pressed stearic acid | 100 |
| No. 4 petrolatum | 125 |
| Once-ground tripoli | 680 |
| Diethyl-cyclohexylamine salt of sulfated hydrogenated coconut oil alcohols | 7 |
| Hydrogenated coconut oil alcohols | 14 |

The mixture is made up in the same manner as Example I. The hydrogenated coconut oil alcohols is preferably a fraction comprising octyl, decyl, dodecyl, tetradecyl, hexadecyl, and octadecyl alcohols predominating in dodecyl and tetradecyl alcohols.

A representative cutting and coloring composition is illustrated by the following example:

Example VI

|  | Pounds |
|---|---|
| Double pressed stearic acid | 292 |
| Tallow stearine | 13 |
| Double-ground tripoli | 680 |
| Technical octadecyl alcohol | 14 |
| Diethyl-cyclohexylamine salt of sulfated technical dodecyl alcohol | 7 |

The composition is made up in the same manner as Example I.

Compositions which are useful for the light or final polishing of metal surfaces are illustrated by the following examples:

Example VII

|  | Pounds |
|---|---|
| Double pressed stearic acid | 250 |
| Air-floated tripoli | 750 |
| Technical octadecyl alcohol | 14 |
| Diethyl-cyclohexylamine salt of sulfated technical dodecyl alcohol | 7 |

The composition is made up in the same manner as Example I.

Example VIII

|  | Pounds |
|---|---|
| Double pressed stearic acid | 250 |
| Air-floated tripoli | 750 |
| Technical octadecyl alcohol | 26 |
| Diethyl-cyclohexylamine salt of sulfated technical dodecyl alcohol | 14 |

The composition is made up in the same manner as Example I.

*Example IX*

| | Pounds |
|---|---|
| Stearic acid | 366 |
| White lime or Vienna lime | 672 |
| Technical octadecyl alcohol | 16 |
| Diethyl-cyclohexylamine salt of sulfated technical dodecyl alcohol | 8 |

The composition is made up in the same manner as Example I.

*Example X*

| | Pounds |
|---|---|
| Stearic acid | 366 |
| 200-mesh pyrophyllite | 336 |
| Air-floated tripoli | 336 |
| Technical octadecyl alcohol | 16 |
| Diethyl-cyclohexylamine salt of sulfated technical dodecyl alcohol | 8 |

The composition is made up in the same manner as Example I.

Other buffing compositions suitable for various uses having different types of abrasives may be illustrated by the following examples. They may be made up in accordance with the procedure set forth in Example I.

*Example XI*

| | Pounds |
|---|---|
| Stearic acid | 200 |
| Tallow stearine | 30 |
| Vienna lime unslacked | 750 |
| Technical octadecyl alcohol | 14 |
| Diethyl-cyclohexylamine salt of sulfated technical dodecyl alcohol | 7 |

*Example XII*

| | Pounds |
|---|---|
| #00 Red iron oxide | 800 |
| Stearic acid | 180 |
| Diethyl-cyclohexylamine salt of sulfated technical dodecyl alcohol | 7 |
| Technical octadecyl alcohol | 14 |

*Example XIII*

| | Pounds |
|---|---|
| Levigated alumina | 830 |
| Stearic acid | 120 |
| Tallow stearine | 30 |
| Diethyl-cyclohexylamine salt of sulfated technical dodecyl alcohol | 7 |
| Technical octadecyl alcohol | 14 |

*Example XIV*

| | Pounds |
|---|---|
| Synthetic aluminum oxide flours abrasive | 600 |
| Levigated alumina | 200 |
| Stearic acid | 150 |
| Tallow stearine | 30 |
| Diethyl-cyclohexylamine salt of sulfated technical dodecyl alcohol | 7 |
| Technical cetyl alcohol | 14 |

*Example XV*

| | Pounds |
|---|---|
| Chromium oxide | 850 |
| Stearic acid | 100 |
| #0 Petrolatum | 30 |
| Technical octadecyl alcohol | 14 |
| Diethyl-cyclohexylamine salt of sulfated technical dodecyl alcohol | 7 |

While fairly good results can be obtained with any amine salt of a higher sulfated alcohol, the tertiary amine salts of alcohols having from twelve to eighteen carbon atoms give excellent results. In the preferred embodiment of this invention, the dialkyl cycloaliphatic amine salts of alkyl sulfates having from twelve to eighteen carbon atoms are used in conjunction with aliphatic alcohols having from sixteen to eighteen carbon atoms.

The amount of the mixture of the higher alcohol and the amine salt of the higher alkyl sulfate may be varied over a wide range. The best results are obtained when about 2% to about 4% by weight of the rouge or buffing composition consists of a mixture containing about two parts of the alcohol and one part of the amine salt.

As the higher alcohol constituent, it is preferred to use technical octadecyl alcohol, but other alcohols having from eight to twenty-four and preferably from twelve to twenty carbon atoms in the molecule may be used. Other compounds may be substituted for the alcohol since their physical properties are related to the alcohols. Among such compounds might be mentioned straight chain aliphatic amines, amides, chlorides, nitriles, ethers of glycols and glycerols, or aliphatic carboxylic acid esters having from twelve to twenty carbon atoms in the molecule.

This invention has the advantage that the addition of the alcohol and amine salts of alkyl sulfates to buffing compositions results in compositions which have a low interfacial tension against water and detergent baths. Consequently, the buffing composition may be readily removed from the metal surfaces by subjecting the surface to the action of an aqueous cleaning solution. A further advantage resides in the fact that the improved results enable operators at polishing wheels to obtain a greater production of piece work. A still further advantage resides in the fact that the improved buffing compositions of this invention reduce or eliminate scratching. Another advantage resides in the feature that both cutting and coloring operations may be combined into a single operation with a resultant substantial saving in operating cost. A still further advantage resides in the fact that the lubricating properties of the compositions are improved. Thus, cheap grades of abrasives can be used in place of the finer and more expensive ones without decreasing the quality and finish of the buffed metal. This invention possesses the further advantage that the compositions may be quickly and economically made wtihout any necessity of ageing. Ageing, however, in some instances produces very beneficial results. In the preparation of buffing compositions in the past it has been necessary to age the prepared compositions for approximately four months before the maximum polishing property is developed. The compositions of the present invention based upon the addition of the higher alcohols and amine salts of alkyl sulfates show maximum polishing properties immediately after they have been prepared and no ageing is necessary. Previous buffing compositions commonly show a crystalline fracture while the compositions of this invention present an amorphous surface on fracture. This invention has the still further advantage that the buffing compositions may be used to polish all types of metal surfaces such as the noble metals, brass, bronze, nickel alloys such as Monel metal, stainless steel and plated metals of all kinds as well as non-metallic surfaces, with excellent results.

As many apparently widely different embodiments of this invention may be made without departing from the spirit and scope thereof, it is to be understood that I do not limit myself to the specific embodiments thereof except as defined in the appended claims.

I claim:

1. A buffing composition containing an abrasive, a binder and a pentavalent nitrogen salt of the formula:

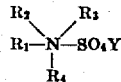

wherein $R_1$ represents hydrogen, an alkyl or a carbocyclic or heterocyclic ring or one end of a polymethylene chain of which $R_2$ is the other end, $R_2$, $R_3$ and $R_4$ represent hydrogen, alkyl groups, carbocyclic and heterocyclic rings, N represents an amino-nitrogen which may be an integral portion of a heterocyclic ring, and Y represents an aliphatic hydrocarbon radical having at least eight carbon atoms which may be further substituted by hydroxyl, alkoxy or halogen groups, and an aliphatic alcohol having from twelve to eighteen carbon atoms.

2. A buffing composition containing an abrasive, a waxy binder, petrolatum and an organic amine salt of a sulfated higher aliphatic alcohol.

3. A buffing composition containing an abrasive, a binder and from about 0.5% to about 2.0% of an organic amine salt of a sulfated higher aliphatic alcohol.

4. A buffing composition containing an abrasive, a binder and an organic amine salt of a higher alkyl sulfate and a higher aliphatic alcohol.

5. A dry buffing composition comprising an abrasive, a waxy binder, an organic amine salt of a sulfated higher aliphatic alcohol, and a higher aliphatic alcohol.

6. A buffing composition comprising an abrasive, a binder, an amine salt of a higher primary alkyl sulfate, and a higher primary aliphatic alcohol.

7. A dry buffing composition comprising an abrasive, a wax, a tertiary amine salt of an alkyl sulfate having from eight to twenty-four carbon atoms in the alkyl sulfate radical, and a saturated primary aliphatic alcohol having from eight to twenty-four carbon atoms.

8. A dry buffing composition comprising an abrasive, a wax, the diethyl-cyclohexylamine salt of dodecyl sulfate, and octadecyl alcohol.

9. A dry buffing composition comprising tripoli, stearic acid, the diethyl-cyclohexylamine salts of dodecyl sulfate and octadecyl alcohol.

10. A dry buffing composition comprising tripoli, stearic acid, petrolatum, the diethyl-cyclohexylamine salts of dodecyl sulfate and octadecyl alcohol.

11. A dry buffing composition comprising rouge, stearic acid and the diethyl-cyclohexylamine salt of octadecyl sulfate, and an aliphatic alcohol having from ten to twenty carbon atoms.

12. A dry buffing composition comprising Vienna lime, stearic acid, triethanolamine dodecyl sulfate, and octadecyl alcohol.

13. A buffing composition containing an abrasive, a binder, an amine salt of a sulfated higher alcohol and a higher straight chain aliphatic compound of the general formula $RCH_2Y$, wherein R is a straight chain hydrocarbon radical having at least 7 carbon atoms and Y is a radical selected from the group consisting of hydroxyl, carboxylic acid ester, halide, amine, amide and nitrile radicals.

14. A buffing composition containing an abrasive, a binder, an amine salt of a sulfated higher alcohol and a higher straight chain aliphatic compound of the general formula $RCH_2Y$, wherein R is a straight chain hydrocarbon radical having from 12 to 20 carbon atoms and Y is a radical selected from the group consisting of hydroxyl, carboxylic acid ester, halide, amine, amide and nitrile radicals.

CLIFFORD V. GLENNING.

CERTIFICATE OF CORRECTION.

Patent No. 2,119,159.    May 31, 1938.

CLIFFORD V. GLENNING.

It is hereby certified that error appears in the printed specification of the above numbered patent requiring correction as follows: Page 1, second column, line 36, for the word "rough" read rouge; and that the said Letters Patent should be read with this correction therein that the same may conform to the record of the case in the Patent Office.

Signed and sealed this 9th day of August, A. D. 1938.

(Seal)

Leslie Frazer
Acting Commissioner of Patents.

specific embodiments thereof except as defined in the appended claims.

I claim:

1. A buffing composition containing an abrasive, a binder and a pentavalent nitrogen salt of the formula:

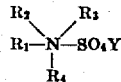

wherein $R_1$ represents hydrogen, an alkyl or a carbocyclic or heterocyclic ring or one end of a polymethylene chain of which $R_2$ is the other end, $R_2$, $R_3$ and $R_4$ represent hydrogen, alkyl groups, carbocyclic and heterocyclic rings, N represents an amino-nitrogen which may be an integral portion of a heterocyclic ring, and Y represents an aliphatic hydrocarbon radical having at least eight carbon atoms which may be further substituted by hydroxyl, alkoxy or halogen groups, and an aliphatic alcohol having from twelve to eighteen carbon atoms.

2. A buffing composition containing an abrasive, a waxy binder, petrolatum and an organic amine salt of a sulfated higher aliphatic alcohol.

3. A buffing composition containing an abrasive, a binder and from about 0.5% to about 2.0% of an organic amine salt of a sulfated higher aliphatic alcohol.

4. A buffing composition containing an abrasive, a binder and an organic amine salt of a higher alkyl sulfate and a higher aliphatic alcohol.

5. A dry buffing composition comprising an abrasive, a waxy binder, an organic amine salt of a sulfated higher aliphatic alcohol, and a higher aliphatic alcohol.

6. A buffing composition comprising an abrasive, a binder, an amine salt of a higher primary alkyl sulfate, and a higher primary aliphatic alcohol.

7. A dry buffing composition comprising an abrasive, a wax, a tertiary amine salt of an alkyl sulfate having from eight to twenty-four carbon atoms in the alkyl sulfate radical, and a saturated primary aliphatic alcohol having from eight to twenty-four carbon atoms.

8. A dry buffing composition comprising an abrasive, a wax, the diethyl-cyclohexylamine salt of dodecyl sulfate, and octadecyl alcohol.

9. A dry buffing composition comprising tripoli, stearic acid, the diethyl-cyclohexylamine salts of dodecyl sulfate and octadecyl alcohol.

10. A dry buffing composition comprising tripoli, stearic acid, petrolatum, the diethyl-cyclohexylamine salts of dodecyl sulfate and octadecyl alcohol.

11. A dry buffing composition comprising rouge, stearic acid and the diethyl-cyclohexylamine salt of octadecyl sulfate, and an aliphatic alcohol having from ten to twenty carbon atoms.

12. A dry buffing composition comprising Vienna lime, stearic acid, triethanolamine dodecyl sulfate, and octadecyl alcohol.

13. A buffing composition containing an abrasive, a binder, an amine salt of a sulfated higher alcohol and a higher straight chain aliphatic compound of the general formula $RCH_2Y$, wherein R is a straight chain hydrocarbon radical having at least 7 carbon atoms and Y is a radical selected from the group consisting of hydroxyl, carboxylic acid ester, halide, amine, amide and nitrile radicals.

14. A buffing composition containing an abrasive, a binder, an amine salt of a sulfated higher alcohol and a higher straight chain aliphatic compound of the general formula $RCH_2Y$, wherein R is a straight chain hydrocarbon radical having from 12 to 20 carbon atoms and Y is a radical selected from the group consisting of hydroxyl, carboxylic acid ester, halide, amine, amide and nitrile radicals.

CLIFFORD V. GLENNING.

CERTIFICATE OF CORRECTION.

Patent No. 2,119,159.                                May 31, 1938.

CLIFFORD V. GLENNING.

It is hereby certified that error appears in the printed specification of the above numbered patent requiring correction as follows: Page 1, second column, line 36, for the word "rough" read rouge; and that the said Letters Patent should be read with this correction therein that the same may conform to the record of the case in the Patent Office.

Signed and sealed this 9th day of August, A. D. 1938.

(Seal)

Leslie Frazer
Acting Commissioner of Patents.

CERTIFICATE OF CORRECTION.

Patent No. 2,119,159.  May 31, 1938.

CLIFFORD V. GLENNING.

It is hereby certified that error appears in the printed specification of the above numbered patent requiring correction as follows: Page 1, second column, line 36, for the word "rough" read rouge; and that the said Letters Patent should be read with this correction therein that the same may conform to the record of the case in the Patent Office.

Signed and sealed this 9th day of August, A. D. 1938.

(Seal)

Leslie Frazer
Acting Commissioner of Patents.